W. H. McCULLOUGH.
CARPET BEATER.
APPLICATION FILED JULY 20, 1911.

1,054,129.

Patented Feb. 25, 1913.

Witnesses:
Chas. F. Bassett
M. A. Milord

Inventor
William H. McCullough
By Frederick Benjamin
Atty.

UNITED STATES PATENT OFFICE.

WILLIAM H. McCULLOUGH, OF CHICAGO, ILLINOIS, ASSIGNOR TO SMITH & PHILLIPS MANUFACTURING COMPANY, OF CHICAGO, ILLINOIS, A CORPORATION OF ILLINOIS.

CARPET-BEATER.

1,054,129.  Specification of Letters Patent.  Patented Feb. 25, 1913.

Application filed July 20, 1911. Serial No. 639,570.

*To all whom it may concern:*

Be it known that I, WILLIAM H. McCULLOUGH, citizen of the United States, residing at Chicago, in the county of Cook and State of Illinois, have invented certain new and useful Improvements in Carpet-Beaters, of which the following is a specification.

This invention relates to improvements in beaters for rugs, carpets and like devices, and the especial object of the improvements which form the subject matter of this application for patent is to produce a device of this kind that can be cheaply manufactured and will possess the necessary strength, flexibility and durability to make it an effective article for the purpose for which it is intended, and also to produce an article that will have the best results in separating the dust from the threads or fibers of which the rug or carpet is composed.

Figure 1:
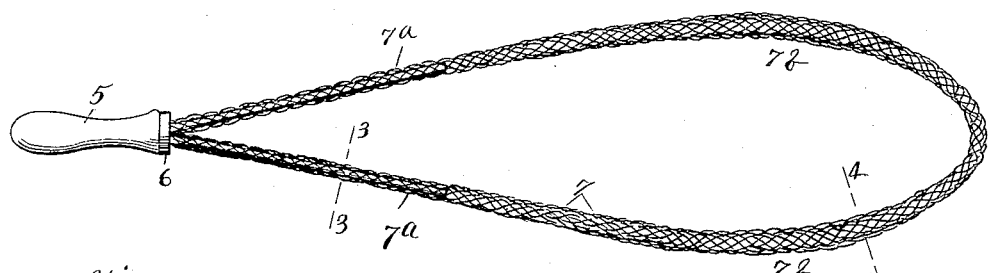
Figure 4:
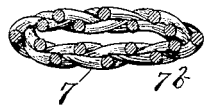
Figure 2:
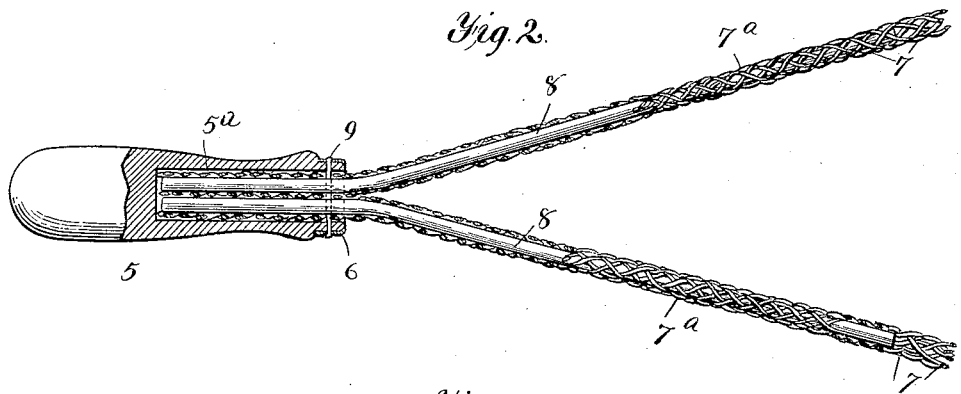
Figure 3:
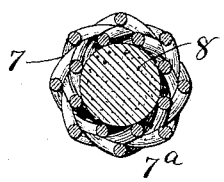

In the accompanying drawing, which forms a part of this application,—Figure 1 shows the article complete; Fig. 2 is a sectional view on an enlarged scale of a portion of the article; Fig. 3 is a cross-section on an enlarged scale on the line 3—3 of Fig. 1, and Fig. 4 is a cross section on the line 4—4 of Fig. 1 on an enlarged scale.

Referring to the details of the drawing, 5 represents a wooden handle which is counterbored for a portion of its length to provide a socket $5^a$, and the handle is furnished with a metal ferrule 6 having a central opening. The beater member proper consists of a tube of woven wire 7, which tube for a portion of its length is in cylindrical form as at $7^a$ and for the rest of its length is flattened as at $7^b$. Extending for the greater part of the cylindrical portion of the woven wire tube are rods 8 which are preferably made of reed or other suitable light flexible and strong material and portions of these rods with the corresponding surrounding portions of the woven wire tubes, are inserted in the socket $5^a$ and are so proportioned as to fit snugly in said socket so that the handle must be driven upon said woven wires and the inclosed rods with considerable force thus providing a tight fit and causing considerable friction between the woven wires adjacent the walls of the socket and said walls. To insure against a possible displacement of the woven wires and the rods a pin 9 is driven through suitable holes in the ferrule 6 and passes through the meshes of the woven wire tube 7 and also through the ratan rods 8.

It will be apparent that the rods 8 will prevent the breaking transversely of the woven wire tubes at the points of greatest strain which are immediately adjacent the inner end of the handle, and at the same time said rods are sufficiently flexible not to impair the action of the beating member as a whole. It will also be apparent that by flattening the outer portion of the loop into which the beating member is formed a broad surface is provided which increases the efficiency of the beater when it is brought in contact with the carpet or rug in the ordinary use of the device. While I have shown and described a pin or rivet 9 for insuring the tension of the beater member in the handle it might be possible to produce such a tight fit between the walls of the socket and the wire members owing to the expansive quality of the woven wire as to render unnecessary the use of such pin or rivet, hence I do not wish to be limited to this feature.

What I claim and desire to secure by Letters Patent, is:—

1. A beater consisting of a suitable handle, a woven wire tube bent to form a loop and having its ends secured in said handle, and stiffening members secured in said handle and extending into said tube for a portion of the length of the loop.

2. A beater comprising a handle having a socket formed therein and a beater member consisting of a tube of woven wire cylindrical for a portion of its length and flattened for a portion of its length and stiffening members extending through the cylindrical portion of said woven wire member, said stiffening members and the cylindrical portion of the beater extending into said handle and secured therein.

In testimony whereof I affix my signature in the presence of two witnesses.

WILLIAM H. McCULLOUGH.

Witnesses:
F. BENJAMIN,
M. A. MILORD.

Copies of this patent may be obtained for five cents each, by addressing the "Commissioner of Patents, Washington, D. C."